US009053346B2

(12) United States Patent
Chhabra et al.

(10) Patent No.: US 9,053,346 B2
(45) Date of Patent: Jun. 9, 2015

(54) LOW-OVERHEAD CRYPTOGRAPHIC METHOD AND APPARATUS FOR PROVIDING MEMORY CONFIDENTIALITY, INTEGRITY AND REPLAY PROTECTION

(75) Inventors: Siddhartha Chhabra, Hillsboro, OR (US); Uday R. Savagaonkar, Portland, OR (US); Carlos V. Rozas, Portland, OR (US); Alpa T. Narendra Trivedi, Hillsboro, OR (US); Men Long, Beaverton, OR (US); David M. Durham, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 166 days.

(21) Appl. No.: 13/976,930

(22) PCT Filed: Dec. 28, 2011

(86) PCT No.: PCT/US2011/067590
§ 371 (c)(1),
(2), (4) Date: Jun. 27, 2013

(87) PCT Pub. No.: WO2013/100965
PCT Pub. Date: Jul. 4, 2013

(65) Prior Publication Data
US 2014/0040632 A1    Feb. 6, 2014

(51) Int. Cl.
*G06F 12/00* (2006.01)
*G06F 21/64* (2013.01)
*G06F 12/14* (2006.01)
*G06F 21/00* (2013.01)
*G06F 21/77* (2013.01)

(52) U.S. Cl.
CPC ............... *G06F 21/64* (2013.01); *G06F 21/00* (2013.01); *G06F 21/77* (2013.01); *G06F 12/1408* (2013.01)

(58) Field of Classification Search
USPC ................. 713/189; 712/205, 214, 216, 227; 380/44
See application file for complete search history.

(56) References Cited

U.S. PATENT DOCUMENTS

| | | | |
|---|---|---|---|
| 6,138,230 A * | 10/2000 | Hervin et al. | 712/216 |
| 2002/0169942 A1 | 11/2002 | Sugimoto | |
| 2003/0044007 A1 * | 3/2003 | Matthews, Jr. | 380/44 |
| 2006/0277395 A1 * | 12/2006 | Fowles | 712/227 |
| 2009/0019317 A1 * | 1/2009 | Quach et al. | 714/47 |
| 2009/0240919 A1 * | 9/2009 | Alexander et al. | 712/214 |
| 2010/0250965 A1 | 9/2010 | Olson et al. | |
| 2011/0072242 A1 * | 3/2011 | Lee et al. | 712/205 |

OTHER PUBLICATIONS

International Search Report and Written Opinion for PCT Application No. PCT/US2011/067590 Mailed Aug. 27, 2012, 13 Pages.
International Preliminary Report on Patentability for PCT Patent Application No. PCT/US2011/067590 mailed Jul. 10, 2014, 5 pages.

* cited by examiner

*Primary Examiner* — Joseph P Hirl
*Assistant Examiner* — Sayed Beheshti Shirazi
(74) *Attorney, Agent, or Firm* — Nicholson De Vos Webster & Elliott, LLP

(57) ABSTRACT

A method and system to provide a low-overhead cryptographic scheme that affords memory confidentiality, integrity and replay-protection by removing the critical read-after-write dependency between the various levels of the cryptographic tree. In one embodiment of the invention, the cryptographic processing of a child node can be pipelined with that of the parent nodes. This parallelization provided by the invention results in an efficient utilization of the cryptographic pipeline, enabling significantly lower performance overheads.

15 Claims, 4 Drawing Sheets

LOW-OVERHEAD CRYPTOGRAPHIC METHOD AND APPARATUS FOR PROVIDING MEMORY CONFIDENTIALITY, INTEGRITY AND REPLAY PROTECTION

CLAIM OF PRIORITY

This application is a U.S. National Phase application under 35 U.S.C. §371 of International Application No. PCT/US2011/067590, filed Dec. 28, 2011, entitled "A LOW-OVERHEAD CRYPTOGRAPHIC METHOD AND APPARATUS FOR PROVIDING MEMORY CONFIDENTIALITY, INTEGRITY AND REPLAY PROTECTION," the entire contents of which are incorporated herein by reference.

FIELD OF THE INVENTION

This invention relates to a platform, and more specifically but not exclusively, to a low-overhead cryptographic method and apparatus for providing memory confidentiality, integrity and replay protection.

BACKGROUND DESCRIPTION

Prior schemes of memory authentication may suffer from inherent read-after-write dependencies between processing of the various levels of the replay protection tree. The cryptography of the replay protection works in such a way that the cryptographic processing of a child node cannot start until the cryptographic processing of the parent node is complete. Consequently, the scheme is very prone to pipeline bubbles, and in the worst case, can end up tripling the memory latency for the protected regions of memory compared to the unprotected regions of memory. Depending on the work load, the added latency can adversely impact the platform's power/performance characteristics significantly.

BRIEF DESCRIPTION OF THE DRAWINGS

The features and advantages of embodiments of the invention will become apparent from the following detailed description of the subject matter in which.

DETAILED DESCRIPTION

Figure 1:
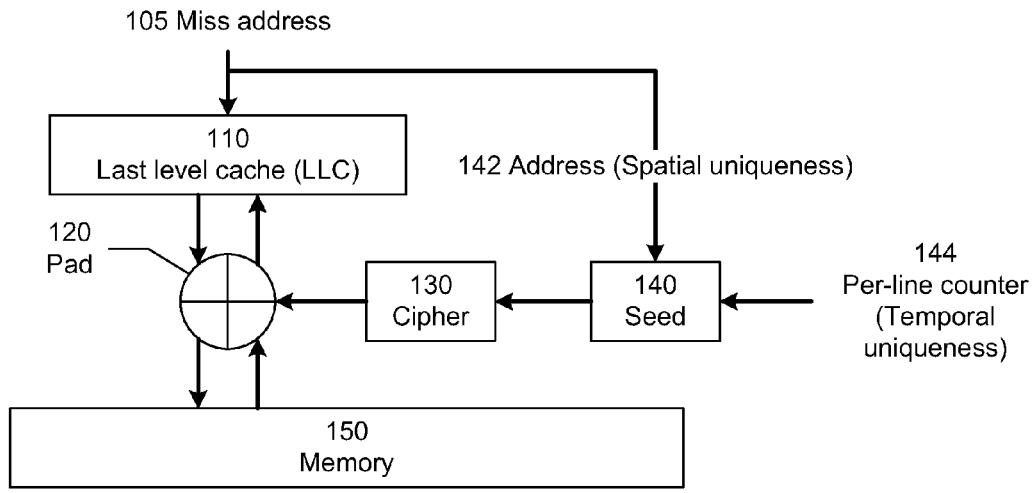
FIG. 1 illustrates a block diagram of the memory protection logic in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a low-overhead cryptographic method and apparatus for providing memory confidentiality, integrity and replay protection. For clarity of illustration, unencrypted sensitive data is referred to as plain text and encrypted data is referred to as cipher text in one embodiment of the invention. The protection of the memory information includes, but is not limited to, confidentiality protection, forgery protection and replay protection.

In one embodiment of the invention, Confidentiality Protection (CP) prevents an attacker in recovering plaintext from cipher text. The retention time of a main memory module such as a dynamic random access memory (DRAM) is important to guarantee that there is no loss of data for security concerns as the DRAM may retain significant sensitive data that should be kept undisclosed. For example, a cold boot attack is a potential attack where an attacker with physical access to the system can exploit the DRAM retention time to recover sensitive data off the main memory.

In another example, the cryptographic key used to encrypt hard the drive may reside in the DRAM. Since the DRAM contents get erased progressively, the contents are accessible for a short period after power down. The access time of the DRAM contents can be further increased from a few seconds to minutes by cooling the DRAM chip. This enables the attackers to successfully read the disk encryption keys off the DRAM by moving the cooled DRAM chip from one computer to another, thereby breaking the hard drive encryption.

In one embodiment of the invention, Forgery Protection (FP) or Integrity protection prevents an attacker from causing any hidden modifications to the cipher text. For example, data may be modified either accidently through hardware or transmission errors or in a deliberate malicious purpose. In either case, the consequences may be quite unpredictable. For example, it can cause execution-flow corruption to leak cryptographic secrets stored in the DRAM.

In one embodiment of the invention, Replay Protection (RP) eliminates any undetected temporal substitution of the cipher text. Web applications for instance can be easily exploited using Replay attacks to cause malicious results. For example, when a user is performing a financial transaction using a web application to verify his login credentials such as username and password, a hacker can capture the packets and replay these packets in the network traffic over a period of time and get access to the user's financial accounts. The hacker could also change the sequence of previous packets to modify program behavior causing undesirable consequences.

Embodiments of the invention provide a cryptographic scheme that removes the read-after-write dependency between the various levels of the cryptographic tree. In one embodiment of the invention, the cryptographic processing of a child node can be pipelined with that of the parent nodes. In this way, the cryptographic pipeline is utilized efficiently and it reduces the latency significantly. In one embodiment of the invention, the system has strong hardware protection for its memory contents via encryption and authentication techniques that are designed specifically to obtain higher performance metrics by ensuring that the normal processor or Central Processing Unit (CPU) execution flow is unaltered by the deployed cryptographic techniques. By doing so, it reduces the cost by saving die area without sacrificing cryptographic strength.

In one embodiment of the invention, the security sensitive data or memory contents of the platform are encrypted using an appropriate Encryption/Decryption algorithm. In one embodiment of the invention, the encryption engine is placed between the Last Level Cache (LLC) and the external memory of the platform.

Whenever data is evicted off the processor chip or module in the platform, the data is encrypted and stored in the main memory of the platform in one embodiment of the invention. By doing so, it eliminates the possibility of an attacker observing plaintext data outside the boundary of the processor chip in one embodiment of the invention. The encryption/decryption algorithm includes, but is not limited to, an XEX [exclusive OR (XOR) followed by encryption followed by XOR] based tweaked mode with Cipher Text Stealing (XTS) mode of encryption to encrypt the Data-lines.

In one embodiment of the invention, a counter mode encryption is utilized for the encryption/decryption algorithm. FIG. 1 illustrates a block diagram of the memory protection logic 100 in accordance with one embodiment of the invention. The memory protection logic 100 encrypts or decrypts a memory line from the LLC 110 using the cryptographic pad 120 in one embodiment of the invention. For example, in one embodiment of the invention, the memory line is XORed with the per-line unique cryptographic pad 120 to encrypt or decrypt it.

The cryptographic pad 120 is generated using the cipher 130 that uses a per-line unique seed 140 which is both temporally and spatially unique. To obtain temporal uniqueness of the seed 140, a per-line counter 144 is used. The per-line counter is incremented each time a memory line is written back to the memory 150 and the counter acts as a version for the memory data line. To obtain spatial uniqueness for the seed 140, the line address or miss address 105 of the memory line is used.

The memory encryption ensures that the confidentiality of the data is retained. In one embodiment of the invention, replay protection is provided by encrypting the sensitive memory contents and authenticating them by creating a hash or Message Authentication Code MAC (MAC) and storing these MACs in a tree structure.

Figure 2:
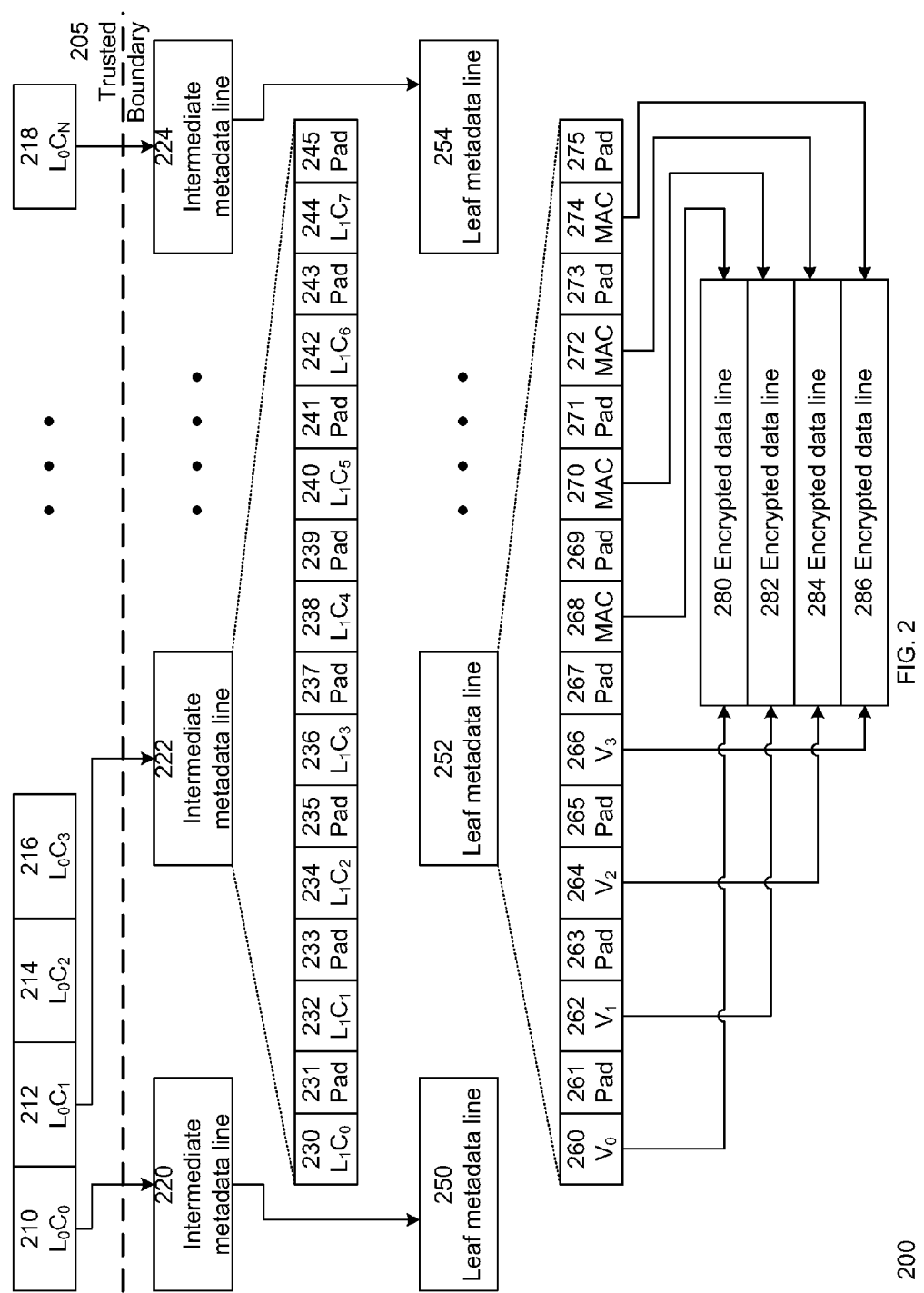
FIG. 2 illustrates a block diagram of the memory protection logic in accordance with one embodiment of the invention.

FIG. 2 illustrates a block diagram 200 of the memory protection logic in accordance with one embodiment of the invention. FIG. 2 is discussed with reference to FIG. 1. For clarity of illustration, a cache memory line that stores data is referred to as a data line and a cache memory line that stores MACs is referred to as MAC line. The block diagram 200 illustrates an efficient counter tree organization that provides memory confidentiality, integrity and replay protection and at the same time requires insignificantly low performance overheads compared to the prior-art counter tree replay protection algorithms.

For clarity of illustration, FIG. 2 illustrates a 128 Megabytes (MB) of protected region in memory. Level 0 ($L_0$) illustrates the on-die counters, $L_1$ for the next level of intermediate nodes and so on. $L_N$ illustrates the leaf node or last node of the tree. For example, the counters $L_0C_0$ 210, $L_0C_1$ 212, $L_0C_2$ 214, $L_0C_3$ 216, and $L_0C_N$ 218 illustrate N number of on-die counters. These counters are within the trusted boundary 205 as they are not easily accessible by an attacker.

In one embodiment of the invention, a dedicated on-die SRAM stores the on-die counters which act as the roots of the tree. The on-die counters are used as an input to generate the MAC in first level intermediate metadata lines. This ensures that the first level metadata lines cannot be tampered while they are resident in memory. By doing so, this ensures that none of the intermediate metadata lines or the data line itself can be modified without being detected as an integrity failure.

Each of the on-die counters is associated with an intermediate metadata line or node. For example, the intermediate metadata lines 220, 222 and 224 illustrate the intermediate metadata line associated with the one-die counter $L_0C_0$ 210, $L_0C_1$ 212 and $L_0C_N$ 218 respectively. Each intermediate metadata line stores a counter and in this illustration, each counter is assumed to have 57 bits and is used as an input for the MAC stored at the next higher counter level. Each intermediate metadata line also stores a MAC over the intermediate line itself. The MAC stored in an intermediate line at level N is computed as follows:

$$L_N MAC = MAC(L_{N-1}C \| L_N Data)$$

$L_N MAC$ is the MAC stored at an intermediate node at level N, $L_{N-1}C$ is the counter value for this node at level N−1 and $L_N Data$ is the data stored in the line at this level.

For an intermediate node at level N, the MAC is computed over the counters stored in the line using the counter from the previous level (N−1) as input to the MAC generation function illustrated above. For example, for the intermediate level 1, the MAC is computed over the counters stored in this level using the corresponding on-die counter as an input. In one embodiment of the invention, each counter is set to a value big enough to avoid a counter roll over for the life time of a system.

The intermediate metadata line 222 is illustrated as comprising $L_1C_0$ 230, pad 231, $L_1C_1$ 232, pad 233, $L_1C_2$ 234, pad 235, $L_1C_3$ 236, pad 237, $L_1C_4$ 238, pad 239, $L_1C_5$ 240, pad 241, $L_1C_6$ 242, pad 243, $L_1C_7$ 244, pad 245. The pads 231, 233, 235, 237, 239, 241, 243, and 245 illustrates the MACs in the intermediate metadata line 222 in one embodiment of the invention.

The leaf tree nodes or leaf metadata line differ from the intermediate metadata line in the data that they store. The leaf metadata lines 250, 252 and 254 illustrate the leaf metadata line associated with the intermediate metadata line 220, 222 and 224 respectively. Each leaf tree nodes or leaf metadata line stores the versions and the MACs computed over the encrypted data lines. The version is used as an input to provide temporal uniqueness to the per-line cryptographic pad, which is then used for encrypting the data lines. The MAC is computed directly over the encrypted lines stored in memory (one per data line).

For example, the leaf metadata line 252 stores four versions $V_0$ 260, $V_1$ 262, $V_2$ 264, $V_3$ 266, and four MACs 268, 270, 272, and 274 corresponding to four encrypted data lines 280, 282, 284, and 286 in the main memory. Like the intermediate nodes, each leaf metadata also contain a MAC computed over the line itself, using counters from the corresponding intermediate metadata line at the previous level. The MACs in the metadata lines are used to ensure the integrity of counters stored at that level in that line.

The number of levels in the tree structure is determined based on, but not limited to, the size of the replay/integrity protected region, the MAC and counter size used and the on-die target. For example, for a replay/integrity protected region of 256 MB, a 56 bits MAC size, 57 bits counter/version size and an on-die target of 16 KB, the number of levels in the tree can be calculated to be 4.

Figure 3:
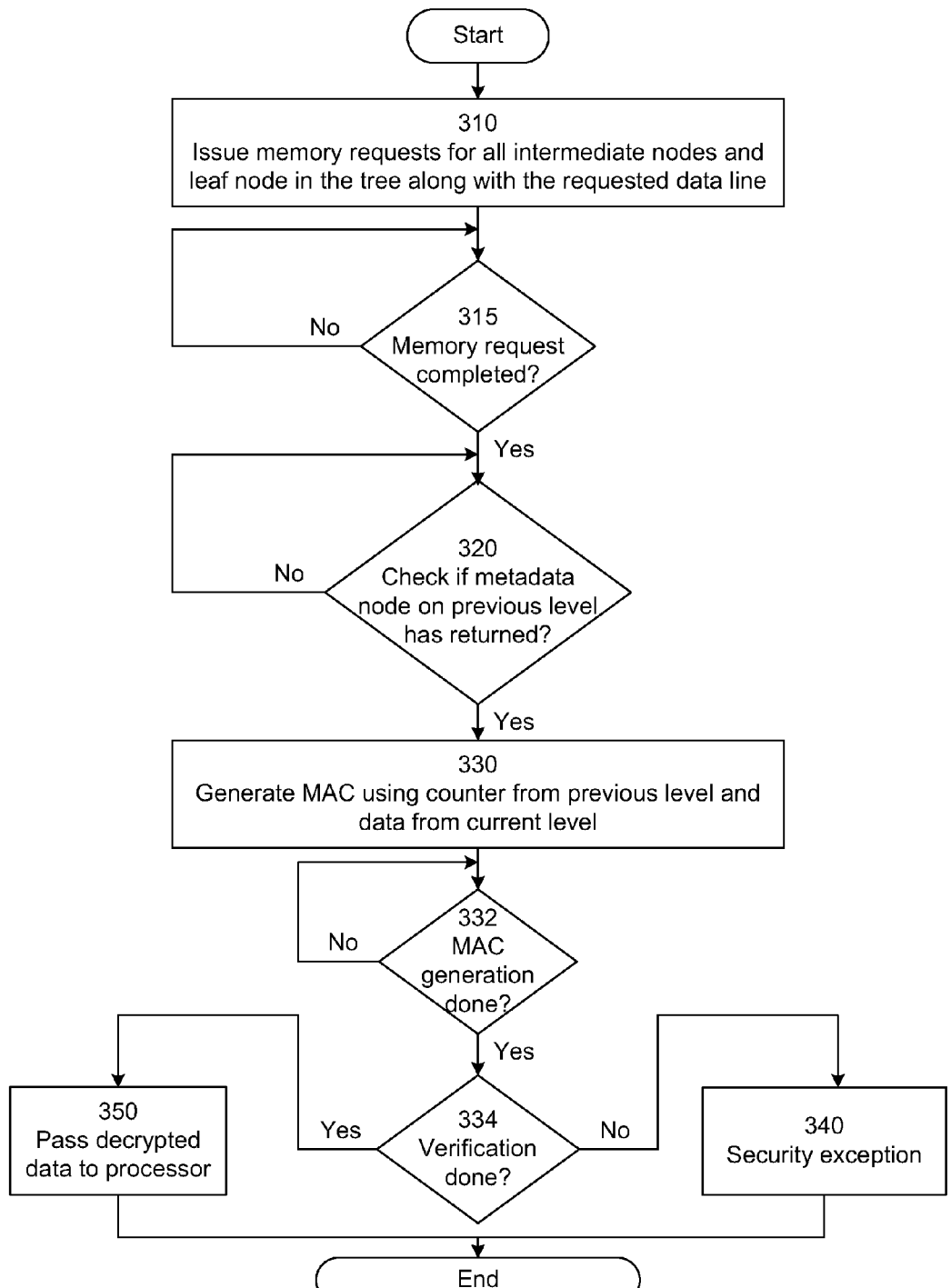
FIG. 3 illustrates a verification operation in accordance with one embodiment of the invention.

FIG. 3 illustrates a verification operation 300 in accordance with one embodiment of the invention. In one embodiment of the invention, a data line read from memory needs to be verified for integrity and anti-replay before feeding the line to the processor. This ensures the integrity of the information.

In step 310, the flow issue memory requests for all intermediate nodes and the leaf nodes in the tree along with the requested data line. Step 315 checks if the memory request to any of the intermediate node or the leaf node has been completed. If no, the flow 300 goes back to step 315. If yes, the flow 300 goes to step 320 and checks if the metadata node on the previous level has returned from memory. For example, for a level N node, step 320 checks if level N−1 node has returned or not. This is required as the counter in the previous level is needed to verify the MAC in this line.

If the metadata node on the previous level has not returned in step 320, the flow 300 goes back to step 320 to continue waiting. If the metadata node on the previous level has returned in step 320, the flow 300 goes to step 330 and generates the MAC using the counter from the previous level and data from the current level. For a data line, step 330 performs an additional step of queuing the requested data line for decryption in one embodiment of the invention.

For level 1 intermediate metadata node, the MAC generation can start as soon as the node returns from memory as the counter used for MAC generation at this level is available in the on-die SRAM. In step 332, the flow 300 checks if the MAC generation has completed for at least one level in the tree. If no, the flow 300 goes back to step 332. If yes, the flow goes to step 334 and checks if the verification for the level(s) identified in step 332 is done. In the verification phase, the flow 300 determines if there are any mismatches. If no, the flow 300 passes the decrypted data to the processor in step 350 and the flow 300 ends. If yes, a security exception is raised and the flow 300 ends.

The flow 300 does not need to wait for MAC generation to complete at all levels in step 332 before the verification phase can start. As and when the MAC generation for one level finishes, the verification can start for that level and a failure at any level triggers a security exception. Once the verification at all levels succeeds, the decrypted data is passed to the processor. Verification failure at any level indicates either replay or modification of the data line while it was resident in the off-chip memory and therefore, the security exception is raised. The verification operation 300 applies for both read and write operations. However, the write operation does not need to decrypt the requested data as the data is already in plain text.

Figure 4:
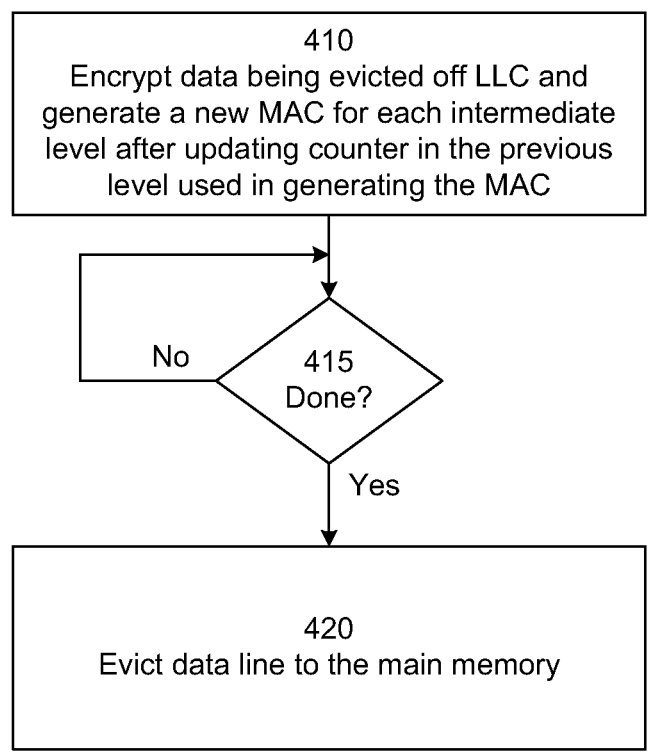
FIG. 4 illustrates an update operation in accordance with one embodiment of the invention.

FIG. 4 illustrates an update operation in accordance with one embodiment of the invention. Following a successful verification cycle, the tree must be updated to reflect the new updated data written to by the processor.

In step 410, the flow 400 encrypts the data line being evicted off the LLC, and generates a new MAC for each intermediate level after updating the counter in the previous level used in generating the MAC. In step 415, the flow 400 checks if the updating is complete for all the intermediate nodes and the leaf node. If no, the flow 400 goes back to step 415. If yes, the flow 400 evicts the data line to the main memory and the flow 400 ends.

Figure 5:
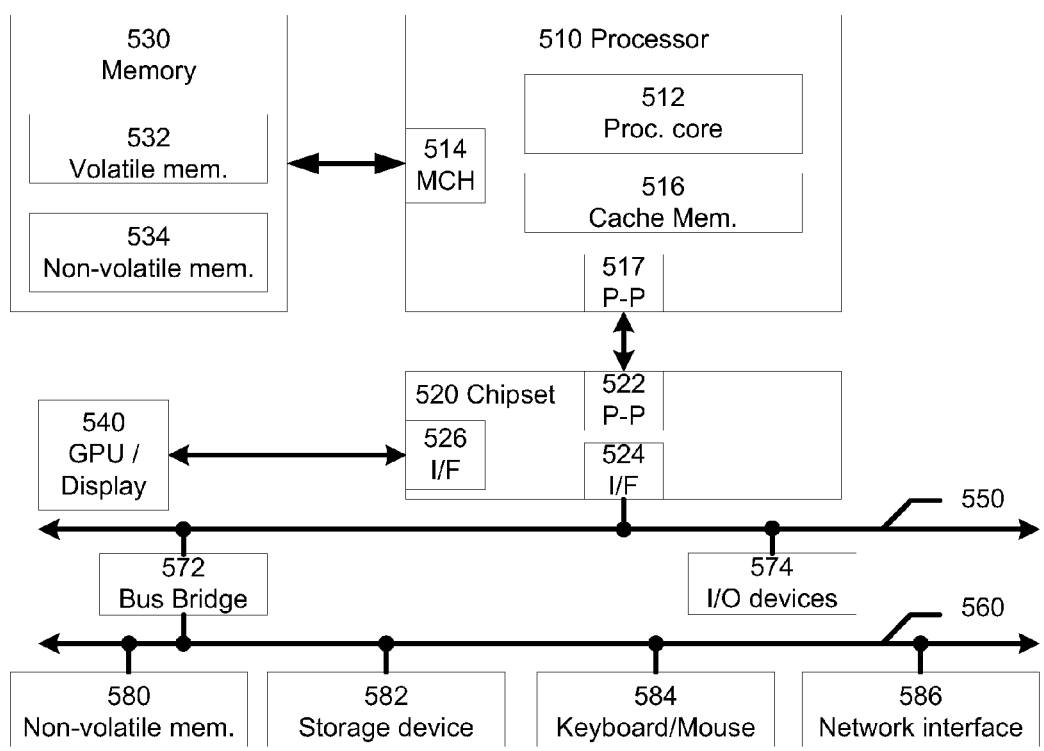
FIG. 5 illustrates a system to implement the methods disclosed herein in accordance with one embodiment of the invention.

FIG. 5 illustrates a system or platform 500 to implement the methods disclosed herein in accordance with one embodiment of the invention. The system 500 includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the system 500 used to implement the methods disclosed herein may be a system on a chip (SOC) system.

The processor 510 has a processing core 512 to execute instructions of the system 500. The processing core 512 includes, but is not limited to, fetch logic to fetch instructions, decode logic to decode the instructions, execution logic to execute instructions and the like. The processor 510 has a cache memory 516 to cache instructions and/or data of the system 500. In another embodiment of the invention, the cache memory 516 includes, but is not limited to, level one, level two and level three, cache memory or any other configuration of the cache memory within the processor 510.

The memory control hub (MCH) 514 performs functions that enable the processor 510 to access and communicate with a memory 530 that includes a volatile memory 532 and/or a non-volatile memory 534. The volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 534 includes, but is not limited to, NAND flash memory, phase change memory (PCM), read only memory (ROM), electrically erasable programmable read only memory (EEPROM), or any other type of non-volatile memory device.

The memory 530 stores information and instructions to be executed by the processor 510. The memory 530 may also stores temporary variables or other intermediate information while the processor 510 is executing instructions. The chipset 520 connects with the processor 510 via Point-to-Point (PtP) interfaces 517 and 522. The chipset 520 enables the processor 510 to connect to other modules in the system 500. In another embodiment of the invention, the chipset 520 is a platform controller hub (PCH). In one embodiment of the invention, the interfaces 517 and 522 operate in accordance with a PtP communication protocol such as the Intel® QuickPath Interconnect (QPI) or the like. The chipset 520 connects to a GPU or a display device 540 that includes, but is not limited to, liquid crystal display (LCD), cathode ray tube (CRT) display, or any other form of visual display device. In another embodiment of the invention, the GPU 540 is not connected to the chipset 520 and is part of the processor 510 (not shown).

In addition, the chipset 520 connects to one or more buses 550 and 560 that interconnect the various modules 574, 580, 582, 584, and 586. Buses 550 and 560 may be interconnected together via a bus bridge 572 if there is a mismatch in bus speed or communication protocol. The chipset 520 couples with, but is not limited to, a non-volatile memory 580, a mass storage device(s) 582, a keyboard/mouse 584 and a network interface 586. The mass storage device 582 includes, but is not limited to, a solid state drive, a hard disk drive, an universal serial bus flash memory drive, or any other form of computer data storage medium. The network interface 586 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the system 500, the functions performed by some of these blocks may be integrated within a single semiconductor circuit or may be implemented using two or more separate integrated circuits. The system 500 may include more than one processor/processing core in another embodiment of the invention.

The methods disclosed herein can be implemented in hardware, software, firmware, or any other combination thereof Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A hardware processor comprising:
   logic to remove read-after-write dependency between one or more levels of a cryptographic tree during cryptographic processing, wherein the cryptographic processing of a child node of the cryptographic tree is to be pipelined with a parent node of the cryptographic tree, wherein the logic to remove the read-after-write dependency between the one or more levels of the cryptographic tree during the cryptographic processing is to:
   issue a memory request for all nodes of the cryptographic tree associated with a requested data line;
   receive a completion of the memory request for one of the nodes of the cryptographic tree;
   determine a counter value from another node that has a level immediately preceding a level of the one node; and
   generate a Message Authentication Code (MAC) for the one node using the determined counter value and data from the same level as the one node in the cryptographic tree in response to determining the counter value from the other node.

2. The hardware processor of claim 1, wherein the logic to remove the read-after-write dependency between the one or more levels of the cryptographic tree during the cryptographic processing is further to:
   perform a verification of the one node using the generated MAC;
   send decrypted data of the requested data line in response to a successful verification of the one using the generated MAC; and
   issue a security exception in response to an unsuccessful verification of the one using the generated MAC.

3. The hardware processor of claim 2, wherein the logic to remove the read-after-write dependency between the one or more levels of the cryptographic tree during the cryptographic processing is further to:
   encrypt data to be evicted from a last level cache (LLC);
   update the counter value from the other node; and
   generate another MAC for the other node.

4. The hardware processor of claim 3, wherein the logic to remove the read-after-write dependency between the one or more levels of the cryptographic tree during the cryptographic processing is further to evict the data from the LLC to a memory.

5. The hardware processor of claim 1, wherein the cryptographic tree is a hybrid Merkel tree, and wherein each node of the cryptographic tree comprises a combination of Message Authentication Codes (MACS) and a plurality of counter values.

6. A system comprising:
   a last level cache (LLC) memory; and
   logic to remove read-after-write dependency between one or more levels of a cryptographic tree during cryptographic processing, wherein the cryptographic processing of a child node of the cryptographic tree is to be pipelined with a parent node of the cryptographic tree, wherein the logic to remove the read-after-write dependency between the one or more levels of the cryptographic tree during the cryptographic processing is to:
   issue a memory request for all nodes of the cryptographic tree associated with a requested data line;
   receive a completion of the memory request for one of the nodes of the cryptographic tree;
   determine a counter value from another node that has a level immediately preceding a level of the one node; and
   generate a Message Authentication Code (MAC) for the one node using the determined counter value and data from the same level as the one node in the cryptographic tree in response to determining the counter value from the other node.

7. The system of claim 6, wherein the logic to remove the read-after-write dependency between the one or more levels of the cryptographic tree during the cryptographic processing is further to:
   perform a verification of the one node using the generated MAC;
   send decrypted data of the requested data line in response to a successful verification of the one using the generated MAC; and
   issue a security exception in response to an unsuccessful verification of the one using the generated MAC.

8. The system of claim 7, wherein the logic to remove the read-after-write dependency between the one or more levels of the cryptographic tree during the cryptographic processing is further to:

encrypt data to be evicted from the LLC memory;
update the counter value from the other node; and
generate another MAC for the other node.

9. The system of claim 8, wherein the logic to remove the read-after-write dependency between the one or more levels of the cryptographic tree during the cryptographic processing is further to evict the data from the LLC to a memory.

10. The system of claim 6, wherein the cryptographic tree is a hybrid Merkel tree, and wherein each node of the cryptographic tree comprises a combination of Message Authentication Codes (MACs) and a plurality of counter values.

11. In a hardware processor, a method comprising:
removing read-after-write dependency between one or more levels of a cryptographic tree during cryptographic processing, wherein the cryptographic processing of a child node of the cryptographic tree is to be pipelined with a parent node of the cryptographic tree, wherein removing the read-after-write dependency between the one or more levels of the cryptographic tree during the cryptographic processing comprises:
issuing a memory request for all nodes of the cryptographic tree associated with a requested data line;
receiving a completion of the memory request for one of the nodes of the cryptographic tree;
determining a counter value from another node that has a level immediately preceding a level of the one node; and
generating a Message Authentication Code (MAC) for the one node using the determined counter value and data from the same level as the one node in the cryptographic tree in response to determining the counter value from the other node.

12. The method of claim 11, wherein removing the read-after-write dependency between the one or more levels of the cryptographic tree during the cryptographic processing comprises:
performing a verification of the one node using the generated MAC;
sending decrypted data of the requested data line in response to a successful verification of the one using the generated MAC; and
issuing a security exception in response to an unsuccessful verification of the one using the generated MAC.

13. The method of claim 12, wherein removing the read-after-write dependency between the one or more levels of the cryptographic tree during the cryptographic processing comprises:
encrypting data to be evicted from a Last Level Cache (LLC) memory;
updating the counter value from the other node; and
generating another MAC for the other node.

14. The method of claim 13, wherein removing the read-after-write dependency between the one or more levels of the cryptographic tree during the cryptographic processing comprises evicting the data from the LLC to a memory.

15. The method of claim 11, wherein the cryptographic tree is a hybrid Merkel tree, and wherein each node of the cryptographic tree comprises a combination of Message Authentication Code (MACs) and a plurality of counter values.

* * * * *